Figure 1:
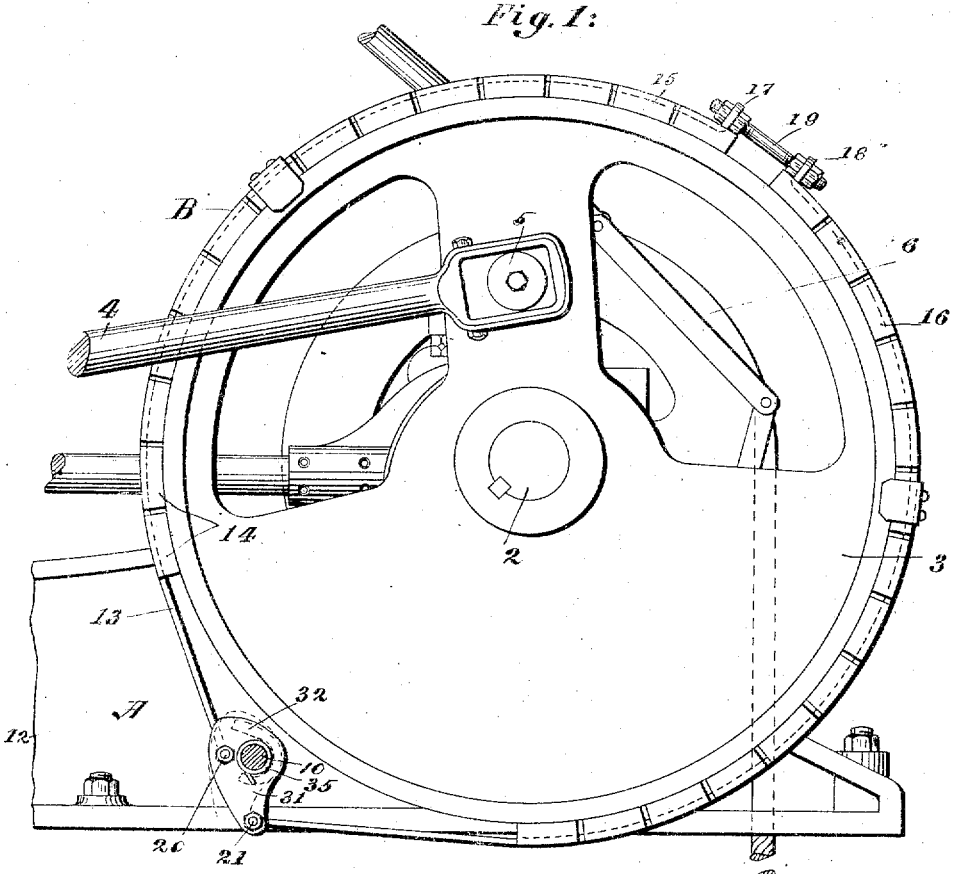

No. 12,040. Reissued Sept. 30, 1902.

A. E. NORRIS.

AUTOMATIC BRAKE.

(Application filed May 29, 1902.)

Witnesses,
Everett S. Emery
Thomas B. Booth

Inventor,
Almon E. Norris,
by Warren L. Emery
Atty.

UNITED STATES PATENT OFFICE.

ALMON E. NORRIS, OF CAMBRIDGE, MASSACHUSETTS.

AUTOMATIC BRAKE.

SPECIFICATION forming part of Reissued Letters Patent No. 12,040, dated September 30, 1902.

Original No. 638,185, dated November 28, 1899. Application for reissue filed May 29, 1902. Serial No. 109,578.

*To all whom it may concern:*

Be it known that I, ALMON E. NORRIS, a citizen of the United States, residing at Cambridge, in the county of Middlesex and Commonwealth of Massachusetts, have invented an Improvement in Automatic Brakes, of which the following description, in connection with the accompanying drawings, is a specification, like characters on the drawings representing like parts.

This invention relates to hoisting apparatus, and particularly to an automatic brake for use in hoisting apparatus, in combination with which said brake is herein illustrated and described.

Hoisting apparatus as commonly constructed usually contains some form of hoisting-drum, and this drum is ordinarily connected with a steam-engine or other form of motor through the medium of a clutch, usually a friction-clutch. When it is desired to raise the load, the clutch is set or applied and the motor operated to rotate the drum in a direction to wind thereon the hoisting-cable, and thereby raise the load. To lower or deposit the load when once hoisted or to lower the empty bucket or whatever form of hoisting devices be employed for the reception of a new load, it is customary to release the clutch more or less and permit the drum to run freely and reel off the hoisting-cable at a rate depending upon the degree to which the clutch is released. This avoids reversing the engine or permitting the latter to be operated in a reverse direction by the descending load, bucket, or device, thus saving wear and tear upon the engine and making it possible to drop the load, bucket, or device more quickly than would otherwise be possible. As hoisting apparatus of this type is usually operated at high speed, it is necessary to provide means for instantly stopping movement of the load, bucket, or hoisting devices, whether the latter be ascending or descending. Obviously an ascending load may be quickly stopped at any time by cutting off the motive power from the engine or motor; but in doing this it is equally necessary to prevent rebound of the load and engine, and as it is impracticable to stop the motor-shaft quickly and lock it against any rebound or reverse movement by means of the motive power employed, whether that be steam or electricity, and as a hand-brake at best is slow and unsatisfactory, it has long been desired to produce some form of automatic brake which will always be operative to catch the motor-shaft the moment it ceases to rotate in a direction to lift the load and there lock it securely against any recovery or return movement. Such a brake makes it possible to stop the ascending bucket or load as quickly as desired and with certainty that it will not rebound as long as the clutch is applied which connects the hoisting-drum with the motor-shaft. On the other hand, the ascending load having been stopped and held by the brake, if the clutch be released to lower the load or bucket the lowering movement may be stopped with equal readiness and precision or gradually by again throwing in the clutch and connecting it to the locked, and therefore stationary, motor-shaft. Of course if the clutch be thrown in quickly the descending load will be stopped instantly; but if thrown in gradually it will be gradually arrested, the clutch then operating as a friction-brake.

Notwithstanding the great necessity for an automatic motor-shaft brake such as above referred to, which shall be controllable wholly by the motor-shaft, being released by rotation in one direction of the shaft and being applied upon any tendency of the shaft to rotate in reverse direction, such a brake, so far as I am aware, has never been produced prior to my invention.

My invention aims to produce such a brake, and my invention will be best understood from a detailed description of one embodiment thereof—such, for instance, as shown in the accompanying drawings.

Figure 2:
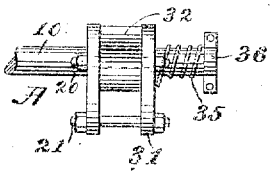
Figure 3:
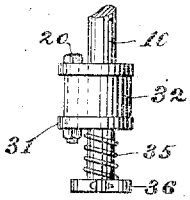
Figure 3:
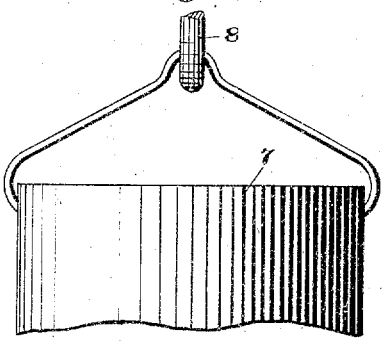

In the drawings, Figure 1 is a side elevation of a motor for operating the hoisting apparatus and is shown provided with a brake mechanism constructed in accordance with my invention. Fig. 2 is a front view of the brake-operating appliance, and Fig. 3 is a top plan view of the same.

In the embodiment of the apparatus herein illustrated I combine with a rotative object operated by the motor a friction-brake, which ordinarily surrounds the circumference of the rotative object, and the construction is such that the rotative object may freely advance or rotate forwardly; but a very slight backward rotation of said object sets the brake automatically, so as to limit the further backward movement of the object controlled thereby, and consequently prevent the fall of the bucket or other load suspended from the drum.

In the representation of the brake illustrated in the accompanying drawings it includes in its construction a strap or band of suitable material which acts against the periphery of a disk or wheel constituting a part of the hoisting apparatus, and the inner face of the band or strap is provided with a series of wear-blocks, ordinarily made of wood, which directly engage the periphery of the wheel.

In the drawings, 2 indicates a motor or power shaft, and 3 a disk or wheel connected with and rotated by it, but which normally rotates in the direction of the arrow, Fig. 1. In the present instance of my invention said power-shaft 2 is the crank-shaft of an ordinary hoisting-engine, the said wheel 3 constituting not only a brake-wheel, but also a crank-wheel carrying a crank-pin 5, to which is coupled the pitman 4 of the engine, whereby said wheel and shaft are positively rotated in the direction of the arrow to lift a load. The shaft 2 also carries a drum 6, which runs loose on said shaft and which is clutched frictionally or otherwise thereto in usual manner when it is desired to elevate a load, such as the bucket 7. The bucket 7 is connected to the cable or rope 8, and the opposite end of said cable is wound around the drum. If for any reason the propelling power should be removed, the bucket, if in midair, under ordinary circumstances would fall; but such a contingency as this is not possible in the present case, as the instant the disk 3 is reversely rotated the automatic brake will be set in action to arrest further reverse rotation of said disk, and consequently the further fall of the bucket connected thereto, it being understood that an almost imperceptible backward movement of the bucket is necessary to effect the action of the brake through the intervention of an automatic actuator, which may be of any suitable kind.

The actuator in the present case is shown as consisting of a rocker A, loosely mounted upon the shaft 10, which is fixed to the bed-plate 12 of the apparatus in adjacence to the periphery of the wheel 3.

The brake (denoted in a general way by B) is shown as including in its construction a band 13, having secured to its inner face the closely-arranged series of wear-blocks 14, which act directly against the wheel to stop the same.

The brake B is represented as consisting of two sections (denoted, respectively, by 15 and 16) provided with offsets or ears 17 and 18, having holes to receive the bolt 19, the opposite ends of which are threaded to receive adjusting and check nuts, and the bolt, with its nuts, serves as a convenient and simple means for drawing the two ends of the strap-sections toward each other for the purpose of taking up any wear that may take place upon the acting faces of the wear-blocks 14.

The lower ends of the two parts of the brake are connected to the upper and lower bolts or pivot-pins 20 and 21 upon the actuator A, and it will be seen upon an inspection of Fig. 1 that the bolts or pivotal points are located at different distances from the axis of oscillation of the actuator A, the point of attachment of the section 15 being very much nearer said axis than the point of attachment of the other strap-sections 16.

As hereinbefore set forth, the forward or hoisting rotation of the disk is indicated by the arrow in Fig. 1, and the outer surface or periphery of the wheel 3 by acting against the wear-blocks 14 will exert to the section 16 of the brake B a pull or stress, which is applied to the actuator or rocker A through the long radius thereof, and the tendency, therefore, is to loosen the band or strap, so as permit the free or normal operation of the wheel, and thereby not affect the hoisting action of the apparatus. Should the loaded bucket 7, however, be suspended from the drum 6 when the power is shut off, the bucket will fall and may do so slightly, and through the intermediate parts the wheel 3 will be reversely turned, and a pull will be exerted upon the actuator or rocker A through the short radius thereof, so that said actuator is swung to the dotted-line position shown in Fig. 1, thereby multiplying the power to such an extent that the lower portion of the strap will be pulled for a relatively considerable distance, thereby tightening the brake upon the wheel and preventing any further backward movement of said wheel, and consequently the falling of the bucket, and it will be evident that the backward motion of the parts in the act of setting the brake is exceedingly slight.

The actuator A, which is loose upon the shaft, is shown as including in its construction two substantially similar plates or sections 30 and 31, united by the curved web 32, partially surrounding said shaft and the upper end of which is adapted to engage the lower end of the strap-section 15, thereby to limit the ineffective motion of said actuator or in a direction opposite to that it takes in setting the brake B.

As the brake must be controlled wholly by the rotative tendency of the motor-shaft, herein the shaft 2, so as to be released upon tendency of the shaft to rotate in one direction to hoist the load and be applied upon tendency of said shaft to rotate in an opposite direction, herein to lower the load, it becomes necessary to maintain the brake-band in constant frictional contact with the periphery of the brake-wheel, so that it may respond immediately to any change in direction of rotation of the said shaft, any movement of the band in the direction of the arrow, Fig. 1, tending to release the brake-wheel and permit rotation of the shaft to hoist a load, while any movement of the brake-band in a direction opposite to the arrow produced by frictional contact of the band with the brake-wheel commencing to move in said opposite direction will immediately apply the brake in the manner described. To maintain this frictional contact, which is essential to the instant and certain operation of the brake shown, I have provided means for oscillating the actuator A in a direction tending constantly to tighten the band about and upon the wheel. Such means in the present embodiment of my invention is in the form of a spring 35, which surrounds the band or shaft 10, one end of the spring being secured to the two-part collar 36, that is clamped to the outer end of said shaft or pin, while the other end thereof is permitted to act upon the oscillatory actuator and by its effort tending to rotate said actuator tends constantly to contract the band about and upon the brake-wheel. Thus at all times there is maintained a constant frictional contact between the band and the wheel which is equivalent to the power or strength of the said spring 35, which, of course, is adjusted so that there shall be sufficient contact to cause instant response of the band to any change in direction of the wheel without producing excessive frictional resistance, it being borne in mind that the engine in running in a direction to raise a load must overcome not only the resistance of the load, but also the frictional resistance by the spring 35 of the band upon the wheel. The moment the crank-shaft of the engine commences to rotate in a reverse direction this frictional contact will shift the brake-band and oscillatory actuator and apply the brake, thus arresting such reverse rotation practically instantly. When hoisting a load, the engineer may therefore cut off his power instantly, with full assurance that the load will be stopped instantly and without any possibility of reaction or rebound, and the shaft thus locked to arrest the ascending load forms an equally sure stop or abutment to which the free-running drum may be clutched to arrest a descending load.

Having described the invention, what I claim is—

1. A brake mechanism comprising a wheel, a band-brake surrounding said wheel, an oscillatory actuator, the ends of the band-brake being connected to said actuator at points located at different distances from its axis of oscillation, and the actuator being operated through the brake-band on the reverse or backward rotation of said wheel, thereby to set the brake, and automatically-operative means acting against said actuator to maintain the said brake-band in contact with said wheel.

2. The combination with a motor-shaft of a motor-shaft-controlled brake, comprising a wheel rotatable by said shaft, a brake-band surrounding said wheel, an oscillatory actuator to which the ends of said brake are connected at different effective distances from the axis of oscillation, and automatically-operative means tending constantly to wrap said brake-band about and in frictional contact with said wheel, whereby positive rotation of said motor-shaft in one direction acts through said frictional contact upon and to move said band and actuator in one direction to relieve the braking effect, and rotation of said motor-shaft in a reverse direction similarly acts to move said band and actuator in an opposite direction to increase the braking effect.

3. A brake mechanism comprising a wheel, a band surrounding said wheel, a fixed shaft, an actuator loosely mounted upon said shaft, a collar fixed to the shaft, and a coiled spring surrounding one end of the shaft and secured respectively to said collar and actuator.

4. A brake mechanism comprising a wheel, an actuator mounted for oscillation and consisting of two parts, a brake-band surrounding said wheel and secured between the two parts of the actuator at points located at different distances from the axis of said actuator, and a web uniting the two parts of the actuator and adapted to engage the brake-band, thereby to limit the movement of the actuator in one direction.

5. The combination with the motor-shaft of a hoisting apparatus and a hoisting-drum capable of being clutched thereto, of a motor-shaft-controlled brake comprising a wheel rotatable by said shaft, a brake-band surrounding said wheel, an oscillatory actuator to which the ends of said brake-band are connected at different effective distances from the axis of oscillation and automatically-operative means tending constantly to rotate said actuator in a direction to wrap said brake-band about and in frictional contact with said wheel, whereby positive rotation of said motor-shaft in one direction acts through said frictional contact upon and to move said band and actuator in one direction to relieve the braking effect, and rotation of said motor-shaft in a reverse direction similarly acts to move said band and actuator in an opposite direction to increase the braking effect.

In witness whereof I have hereunto set my hand in the presence of two subscribing witnesses.

ALMON E. NORRIS.

Witnesses:
FREDERICK L. EMERY,
EVERETT S. EMERY.